United States Patent
Birke et al.

(10) Patent No.: US 9,485,188 B2
(45) Date of Patent: Nov. 1, 2016

(54) VIRTUAL SWITCHING BASED FLOW CONTROL

(71) Applicant: INTERNATIONAL BUSINESS MACHINES CORPORATION, Armonk, NY (US)

(72) Inventors: Robert Birke, Kilchberg (CH); Daniel Crisan, Zug (CH); Casimer M. DeCusatis, Poughkeepsie, NY (US); Mircea Gusat, Langnau (CH); Keshav G. Kamble, Fremont, CA (US); Cyriel J. Minkenberg, Gutenswil (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 84 days.

(21) Appl. No.: 13/757,612

(22) Filed: Feb. 1, 2013

(65) Prior Publication Data
US 2014/0219287 A1    Aug. 7, 2014

(51) Int. Cl.
*H04L 12/863* (2013.01)
*H04L 12/801* (2013.01)
*H04L 12/835* (2013.01)
*H04L 12/931* (2013.01)

(52) U.S. Cl.
CPC ............ *H04L 47/621* (2013.01); *H04L 47/29* (2013.01); *H04L 47/30* (2013.01); *H04L 49/00* (2013.01)

(58) Field of Classification Search
CPC ....... H04L 47/00; H04L 47/12; H04L 47/29; H04L 47/30; H04L 47/621; H04L 49/901
USPC ....... 370/235, 412, 389, 230, 388, 244, 225, 370/229, 351, 354, 392, 232, 236
See application file for complete search history.

(56) References Cited

U.S. PATENT DOCUMENTS

| | | | | |
|---|---|---|---|---|
| 5,138,615 A * | 8/1992 | Lamport | ................. | H04L 45/02 370/400 |
| 6,408,005 B1 * | 6/2002 | Fan | ..................... | H04L 12/5602 370/412 |
| 7,433,305 B2 * | 10/2008 | Hansson et al. | ............... | 370/229 |
| 7,593,329 B2 * | 9/2009 | Kwan | ................. | H04L 12/5693 370/230 |
| 8,018,849 B1 * | 9/2011 | Wentzlaff | .......... | G06F 15/17337 326/41 |
| 8,174,984 B2 | 5/2012 | Tripathi et al. | | |
| 2003/0152096 A1 * | 8/2003 | Chapman | ............ | H04L 12/5695 370/412 |
| 2006/0018329 A1 * | 1/2006 | Nielsen | ................... | H04L 47/52 370/401 |
| 2007/0011362 A1 * | 1/2007 | Umekage | .............. | G06F 3/1208 710/15 |
| 2011/0035494 A1 * | 2/2011 | Pandey | ................. | G06F 9/5077 709/224 |
| 2011/0103389 A1 * | 5/2011 | Kidambi et al. | ........... | 370/395.1 |
| 2012/0016973 A1 * | 1/2012 | Haris | .................. | H04L 12/5696 709/220 |
| 2013/0051235 A1 * | 2/2013 | Song et al. | .................... | 370/235 |
| 2013/0151750 A1 * | 6/2013 | Kanigicherla | ...... | G06F 13/4022 710/313 |
| 2014/0115578 A1 * | 4/2014 | Cooper | ................. | G06F 21/606 718/1 |

* cited by examiner

*Primary Examiner* — Habte Mered
*Assistant Examiner* — Rownak Islam
(74) *Attorney, Agent, or Firm* — Shimokaji IP (57) ABSTRACT

Flow control of data packets in a network may be enabled to at least one side of a virtual switching interface to provide a lossless environment. In some embodiments, wherever two buffer queues are in communication with at least one buffer queue being connected to a virtual switching interface, flow control may be used to determine if a threshold has been exceeded in one of the buffer queues. When exceeded, the transmission of data packets may cease to one of the buffer queues to prevent packet dropping and loss of data.

15 Claims, 5 Drawing Sheets

VIRTUAL SWITCHING BASED FLOW CONTROL

BACKGROUND

The present invention relates to data networking, and more specifically, to virtual switching based flow control.

Packet loss in data networks is a well known cause of poor performance in networking systems. Typically, physical switches are incorporated with measures to minimize packet loss. Ideally, a physical network seeks to operate in a lossless environment.

However, lossless environments in virtual switch networks may be a more difficult task. Typically, virtual components may operate entirely within a single switch or server and or in some cases may span over multiple physical machines. In some cases, where the physical network machine has incorporated measures to provide a lossless environment, the virtual machine(s) communicating with the physical machine may not understand the controlling software. Accordingly, the physical machine may reject interfacing with a virtual machine that is attempting to transfer data packets through the physical machine.

Thus it may be seen that a virtual networking environment may benefit from the implementation of data flow control that may be compatible with a physical networking environment.

SUMMARY

According to an exemplary embodiment of the present invention, a computer program product for controlling data traffic in a network with a virtual switch, the computer program product comprises a computer readable storage medium having program code embodied therewith. The program code may be readable/executable by a processor to: determine, by the processor, that a data packet is designated for queuing up in a buffer queue connected to a virtual switching entity; determine, by the processor, whether a threshold in the buffer queue is exceeded; and control, by the processor, the flow of the data packet to or from the virtual switching entity based on the determination of the threshold in the buffer queue being exceeded.

According to another exemplary embodiment of the present invention, a system comprises a first switching interface. A first buffering area may be connected to the first switching interface. A second switching interface may be configured for virtual switching in a data network. A second buffering area may be connected to the first buffering area and to the second switching interface. A processor may be configured to control a flow of data packets between the first buffering area and the second buffering area based on whether a threshold in the second buffering area is exceeded.

According to yet another embodiment of the present invention, a method of controlling data packet flow in a network with at least one virtual switching entity comprises receiving a data packet either with a source address from the virtual switching entity or designated with a destination address to the virtual switching entity. It may be determined whether the data packet is designated for queuing in a first buffer queue. The data packet may be queued in the first buffer queue. It may be determined whether a threshold of the first buffer queue has been exceeded. A flow of more data packets either with a source address from the virtual switching entity or with a destination address to the virtual switching entity, to the first buffer queue may be controlled if the threshold has been exceeded.

According to yet another embodiment of the present invention, a method for building a lossless data transfer environment in a virtualized network comprises generating flow control commands between hardware and software elements in the virtualized network; and receiving the flow control commands, without packet loss or packet drops, at either the hardware or software elements in the virtualized network.

DETAILED DESCRIPTION

In general, embodiments of the subject disclosure may provide flow control of data packets wherever two queues in a virtual network are in communication with one another. More particularly, embodiments of the subject disclosure may control packet flow using software defined networking (SDN) between any input buffer and output buffer within a network using virtual switching to provide a lossless environment in data transfer. An exemplary embodiment may include a lossless Distributed Overlay Virtual Ethernet (DOVE) SDN program for CEE networks with a vPFC interface. In an alternate embodiment, credit based flow control signals from an external source may be used to interface with hardware using a PCI express (PCIe) or an Infiniband interface.

As will be appreciated by one skilled in the art, aspects of the present invention may be embodied as a system, method or process, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable storage media having computer readable program code embodied thereon.

Any combination of one or more computer readable storage media may be utilized. A computer readable storage medium is an electronic, magnetic, optical, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium is any tangible medium that can store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus may provide processes for implementing the functions/acts specified in the flowchart and/or block diagram block or blocks.

Figure 1:
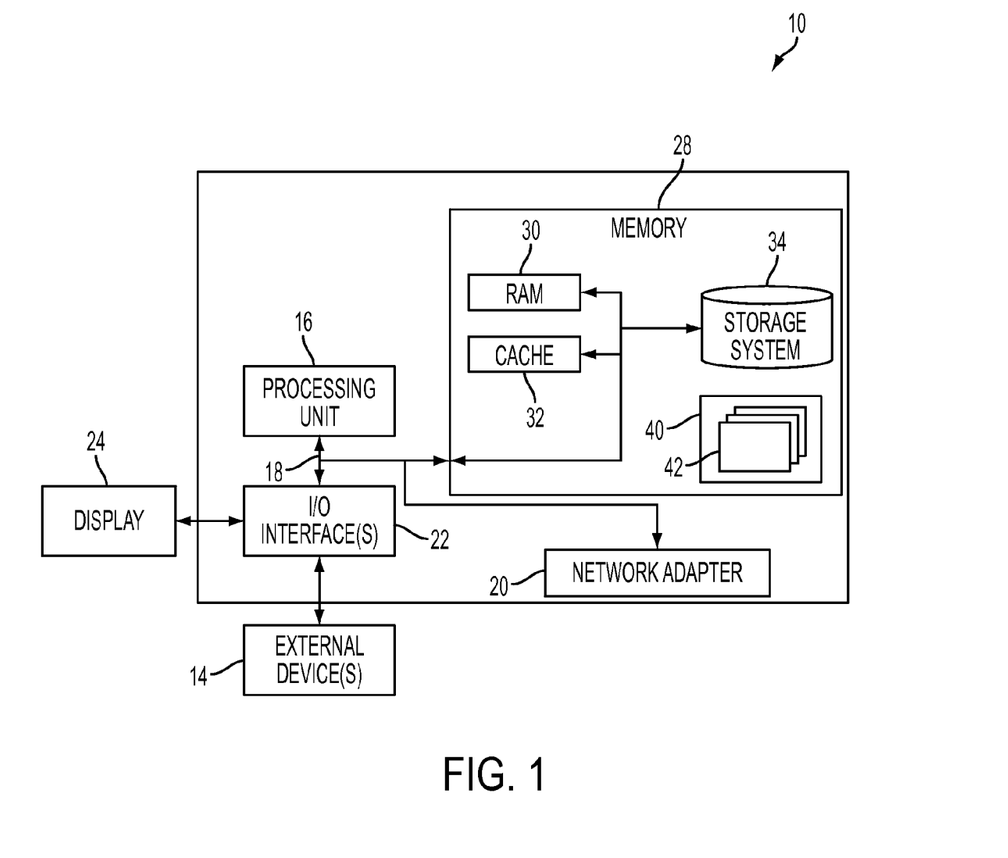
FIG. 1 depicts a computer system according to an embodiment of the present invention.

Referring now to FIG. 1, a schematic of a computing system 10 is shown. The computing system 10 illustrated is only one example of a suitable cloud computing node and is not intended to suggest any limitation as to the scope of use or functionality of embodiments of the invention described herein. Regardless, the computing system 10 is capable of being implemented and/or performing any of the functionality set forth herein.

The computing system 10 may be operational with numerous other general purpose or special purpose computing system environments or configurations. Examples of well-known computing systems, environments, and/or configurations that may be suitable for use as the computing system 10 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computing system 10 may be described in the general context of computer system executable instructions, such as program modules, being executed by a computer system. Generally, program modules may include routines, programs, objects, components, logic, data structures, and so on that perform particular tasks or implement particular abstract data types. The computing system 10 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computing system 10 is shown in the form of a general-purpose computing device. The components of the computing system 10 may include, but are not limited to, one or more processors or processing units 16, a system memory 28, and a bus 18 that couples various system components including the system memory 28 to the processor 16.

The bus 18 represents one or more of any of several types of bus structures, including a memory bus or memory controller, a peripheral bus, an accelerated graphics port, and a processor or local bus using any of a variety of bus architectures. By way of example, and not limitation, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computing system 10 may typically include a variety of computer system readable media. Such media could be chosen from any available media that is accessible by computing system 10, including volatile and non-volatile media, removable and non-removable media.

The system memory 28 could include one or more computer system readable media in the form of volatile memory, such as a random access memory (RAM) 30 and/or a cache memory 32. The computing system 10 may further include other removable/non-removable, volatile/non-volatile computer system storage media. By way of example only, a storage system 34 may be provided for reading from and writing to a non-removable, non-volatile magnetic media device typically called a "hard drive" (not shown). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media could be provided. The storage system 34 may also include other forms of storage media such as flash memory for example. In such instances, each computer system storage media may be connected to the bus 18 by one or more data media interfaces. As will be further depicted and described below, the system memory 28 may include at least one program product having a set (e.g., at least one) of program modules that are configured to carry out the functions of embodiments of the invention.

A program/utility 40, having a set (at least one) of program modules 42, may be stored in the system memory 28 by way of example, and not limitation, as well as an operating system, one or more application programs, other program modules, and program data. Each of the operating system, one or more application programs, other program modules, and program data or some combination thereof, may include an implementation of a networking environment. The program modules 42 generally carry out the functions and/or methodologies of embodiments of the invention as described herein.

The computing system 10 may also communicate with one or more external devices 14 such as a keyboard, a pointing device, a display 24, etc.; one or more devices that enable a user to interact with the computing system 10; and/or any devices (e.g., network card, modem, etc.) that enable the computing system 10 to communicate with one or more other computing devices. Such communication can occur via Input/Output (I/O) interfaces 22. Alternatively, the computing system 10 can communicate with one or more networks such as a local area network (LAN), a general wide area network (WAN), and/or a public network (e.g., the Internet) via a network adapter 20. As depicted, the network adapter 20 may communicate with the other components of the computing system 10 via the bus 18. It should be understood that although not shown, other hardware and/or software components could be used in conjunction with the computing system 10. Examples include, but are not limited to: microcode, device drivers, redundant processing units, external disk drive arrays, RAID systems, tape drives, and data archival storage systems, etc.

Figure 2:
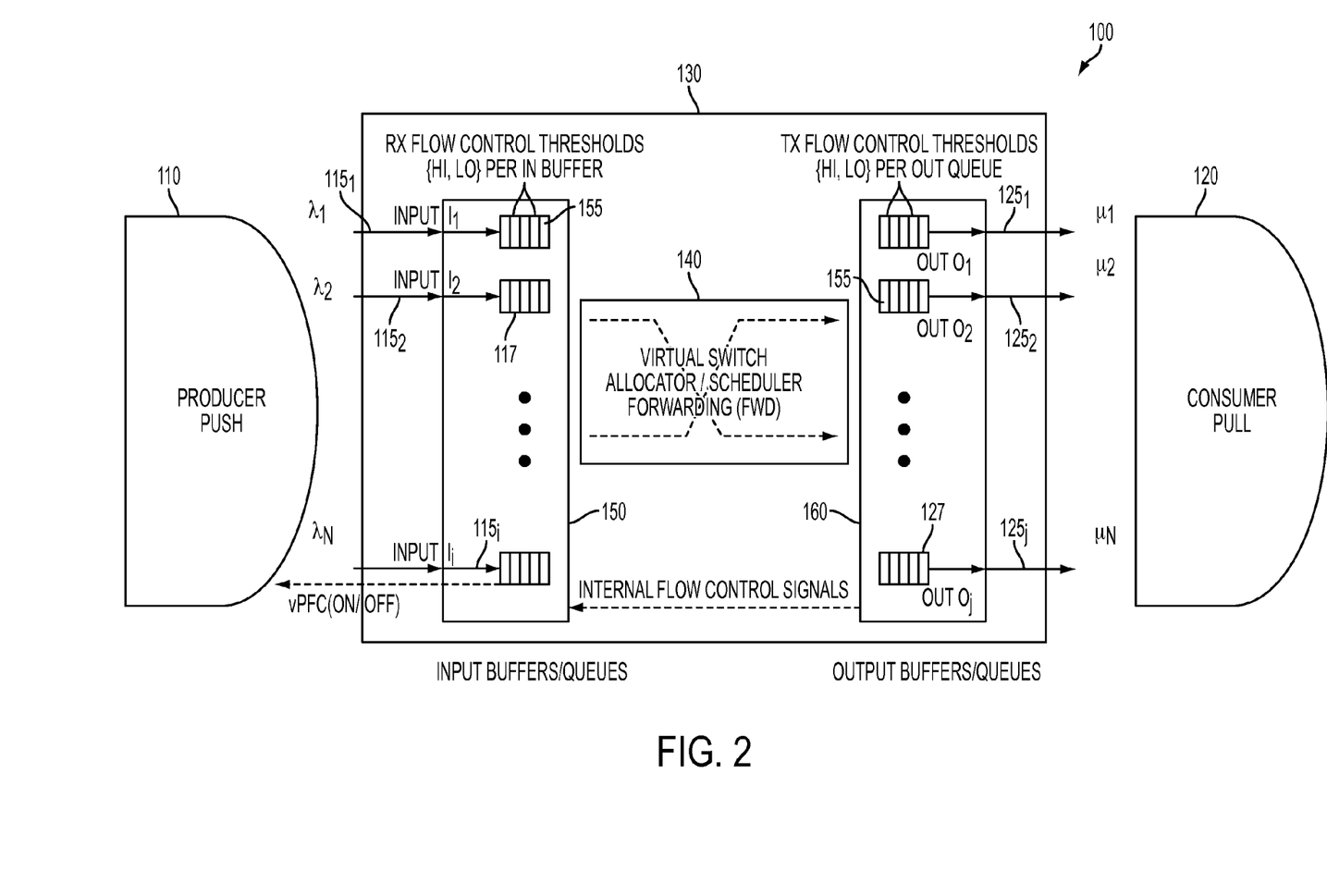
FIG. 2 depicts a data communication system according to an embodiment of the present invention.

Referring now to FIG. 2, a data communication system 100 is shown according to an exemplary embodiment of the present invention. The data communication system may also be referred to as the system 100. In general, the system 100 may be configured to provide a lossless data packet transfer environment by reacting to, responding to, and generating standard flow control signals. The flow control signals may be for example, priority-based flow control (PFC), PCI Express (PCIe) and Infiniband (IB) credits. In some embodiments, the flow control signals may be On/Off grants, rate increase/decrease signals, or S-PFC signals. The system 100 may use the flow control signals to transmit or receive packets without packet losses or drops between physical and virtual networks, and any combination thereof.

In an exemplary embodiment, the system 100 is part of a virtual switching environment. The system 100 may represent any switching interface between two buffering entities that are exchanging data packets. For example, the system 100 may include a data packet producer 110 exchanging data packets with a data packet consumer 120. The data packet producer 110 is the transmitting side of the system 100 while the data packet consumer 120 is the receiving side. In an exemplary embodiment, at least one side (either the data packet producer 110 or the data packet consumer 120) of the system 100 is a virtual entity (for example, virtual switches, virtual machines, hypervisors, virtual network interface cards (vNICs), etc.). The interface between the producer 110 and the consumer 120 may be between two entirely virtual entities. In some embodiments, the producer 110 or the consumer 120 may be a virtual switching entity while the other may be a physical switching entity (for example, a physical network switch or NIC).

The system 100 may be configured to provide flow control of data packets exchanged between the data packet producer 110 and the data packet consumer 120. The flow control of input data packet streams ($115_1$, $115_2$ ... $115_i$) (referred to collectively as input streams 115) and output data packet streams ($125_1$, $125_2$ ... $125_j$) (referred to collectively as output streams 125) may be controlled for example, by the program 40 (FIG. 1). The program 40 may include SDN controller stored in either hardware or software elements of the system 100. The SDN controller may generate flow control commands and react to flow control between the hardware and software elements. The program 40 may control for example, the processor 16 (FIG. 1) or any networking element for which the system 100 is implemented into to implement any of the following functions or steps. The program 40 may allocate an input buffer area 150 to the data packet producer 110. The input buffer area 150 may include an input buffer queue 117 dedicated to each input stream 115. Each input buffer queue 117 may be configured to store a plurality of data packets 155. While each input buffer queue 117 shows five data packets 155, it will be understood that typically there is room for more packets within a queue 117. For each input buffer queue 117 the program 40 may designate thresholds for the number of data packets 155 in the input buffer queue 117 that may trigger an action by the processor 16.

The program 40 may allocate an output buffer area 160 to the data packet consumer 120. The output area buffer 160 may include an output buffer queue 127 for each output stream 125. The output buffer queues 127 may be configured to receive data packets 155 provided from the input data streams 115 as allocated by a forwarding engine 140. The forwarding engine 140 may be configured to handle functions such as virtual switching allocation of data packets through the system 100 and scheduling/forwarding of data packets through the system 100. For each output buffer queue 127 the program 40 may designate thresholds for the number of data packets 155 in the output buffer queue 127 that may trigger an action by the processor 16.

In an exemplary embodiment, the program 40 may be configured to control the flow of data packets 155 into the input buffer queues 117 and/or into the output buffer queues 127 to prevent packet loss. In some embodiments, the data packet 155 may enter either the input buffer queue 117 or the output buffer queue 127 through a switching device, for example a virtual switch or a hypervisor. In some embodiments, the data packet 155 may bypass the switching device en route to the output buffer queue 127. The program 40 may determine if a threshold for a maximum number of data packets 155 in the output buffer queue 127 before receiving more packets has been reached. The threshold for the maximum number of data packets 155 is not necessarily the entire room available in the output buffer queue 127. When the threshold for a maximum number of data packets 155 is reached, the processor 16 may send a command to stop the input data streams 115 from communicating more data packets 155 into one or more of the input buffer queues 117.

Internal flow control signals may be exchanged between the output buffer queues 127 and the input buffer queues 117 signaling when the output buffer queues 117 release enough data packets 155 reaching a threshold signaling room for receipt of new data packets 155. Also for example, the program 140 may stop the data packet producer 110 from sending more data packets 155 when the input buffer queues 117 have reached a threshold for a maximum number of data packets 155 in the input buffer queue 117.

Thus, with flow control opportunities present at two buffering locations of a virtual switching interface (the input and output sides), a lossless environment may be achieved even in a virtual networking environment. This may provide compatibility with physical networking machines since the interfaces to the buffers may appear to resemble the buffering constraints of a physical buffer space. The compatibility may protect the internal networking interfaces between hardware and software components, for example, by offloading networking capacity from the physical machines to the virtual machines without fear of packet loss. For example, point to point flow control in a virtualized network employing embodiments of the present invention may be realized in otherwise incompatible interfaces.

S/W Producer—S/W Consumer

In some interfaces, the data packet producer 110 is software based and transmitting to software based consumer 120. The data packet producer 110 and the consumer 120 may be from different vendors or have incompatible application programming interfaces (APIs). To bridge the incompatibility, an On/Off flow control loop synchronized via an externally visible packet or signal may be used by the system 100 to control packet flow as described above. The signal types may include for example, Converged Enhanced Ethernet (CEE) PFC frame (vPFC) (incl. S-PFC etc.) in CEE networks; PCIe flow control credit (vCDT_PCIe) in PCIe interfaces including SR-IOV (Single Rooted I/O Virtualization) and MR-IOV (Multi-Rooted I/O Virtualization) offload environments; and Infiniband flow control credit (vCDT_IB) for Infiniband interfaces.

H/W Producer—S/W Consumer

In some interfaces, the data packet producer 110 is hardware based and transmitting to software based consumer 120. The data packet producer 110 and the consumer 120 may be from different vendors or have incompatible application programming interfaces (APIs). To bridge the incompatibility, an On/Off flow control loop synchronized via an externally visible packet or signal may be used by the system 100 to control packet flow as described above. The signal types may include for example, Converged Enhanced Ethernet (CEE) PFC frame (vPFC) (incl. S-PFC etc.) in CEE networks; PCIe flow control credit (vCDT_PCIe) in PCIe interfaces including SR-IOV (Single Rooted I/O Virtualization) and MR-IOV (Multi-Rooted I/O Virtualization) offload environments; and Infiniband flow control credit (vCDT_IB) for Infiniband interfaces.

S/W Producer—H/W Consumer

In some interfaces, the data packet producer 110 is software based and transmitting to hardware based consumer 120. The data packet producer 110 and the consumer 120 may be from different vendors or have incompatible application programming interfaces (APIs). To bridge the incompatibility, an On/Off flow control loop synchronized via an externally visible packet or signal may be used by the system 100 to control packet flow as described above. The signal types may include for example, Converged Enhanced Ethernet (CEE) PFC frame (vPFC) (incl. S-PFC etc.) in CEE networks; PCIe flow control credit (vCDT_PCIe) in PCIe interfaces including SR-IOV (Single Rooted I/O Virtualization) and MR-IOV (Multi-Rooted I/O Virtualization) offload environments; and Infiniband flow control credit (vCDT_IB) for Infiniband interfaces.

Details of the input side buffer control and output side buffer control are described according to the following descriptions of flow charts.

Figure 3:
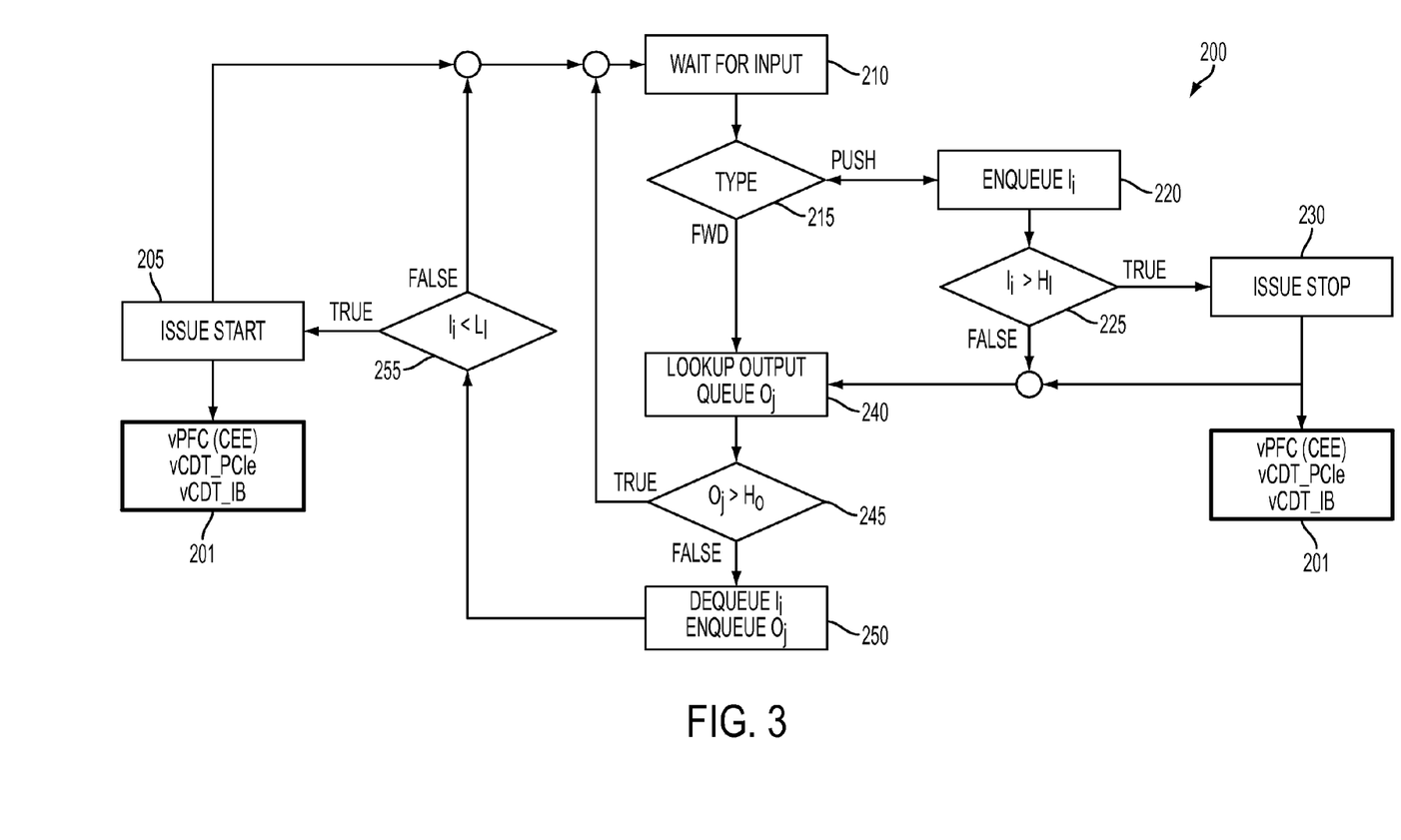
FIG. 3 depicts a method of controlling an input side of data traffic within a network with a virtual switch according to another embodiment of the present invention.

Referring now to FIG. 3, a method 200 of controlling an input side of data traffic within a network with a virtual switch is shown according to an exemplary embodiment of the present invention. In some embodiments, the processor may receive 201, a flow control signal from an external source. The flow control signal may be for example, a buffering credit (for example, PCIe flow control credit or Infiniband flow control credit. In other embodiments, the flow control signal may be internal. The flow control signal may be from either the producing or consuming side of a data packet interface. The receipt of a flow control signal may cause the processor to issue 205 a start command to process data packets in a data exchange between an input buffer ($I_i$) queue and an output buffer ($O_j$) queue. In an exemplary embodiment, a virtual switching entity may be connected to either the input buffer queue or the output buffer queue. Accordingly, the data packet may be received with a source address from a virtual switching entity or may be designated with a destination address to a virtual switching entity. The processor may wait 210 for receipt of a data packet from a virtual switching entity. The processor may determine 215 the type of data packet received. The data packet may be one designated for queuing in an input buffer queue or may be one designated for forwarding to the output buffer queue. Data packets marked as incoming from a producer may be designated 220 for queue in the input buffer queue. The processor may determine 225 whether the storage in the input buffer queue is more than the threshold for a maximum number of data packets in the input buffer queue. If the threshold has been exceeded, then the processor may issue 230 a stop command to the producer to stop sending further data packets. If the threshold for a maximum number of data packets in the input buffer queue has not been exceeded or if the stop command has issued, then the processor may check 240 the status of the output buffer queue for room to receive data packets. Also, if in step 215, the data packet was marked for forwarding to the output buffer queue, then the processor may proceed directly to checking 240 the status of the output buffer queue. The processor may determine 245 whether the storage in the output buffer queue is more than the threshold for a maximum number of data packets in the output buffer queue. If the threshold has been exceeded, then the data packet may cycle through the method 200 until the processor determines 245 that the threshold is not exceeded or packets from that queue have been dequeued which creates an opportunity to enqueue more packets. When the output buffer queue storage is below the threshold, the processor may remove 250 the data packet from the input buffer queue and may queue up the data packet for the output buffer queue. The processor may determine 255 whether the input buffer queue storage is below the threshold signaling room for receipt of new data packets. If the input buffer queue storage is above the threshold signaling room for receipt of new data packets, then the processor may cycle through the method 200 until the processor determines 255 that the input buffer may have room to receive new packets. If the input buffer queue is receiving new data packets then the processor may return to step 205.

Figure 4:
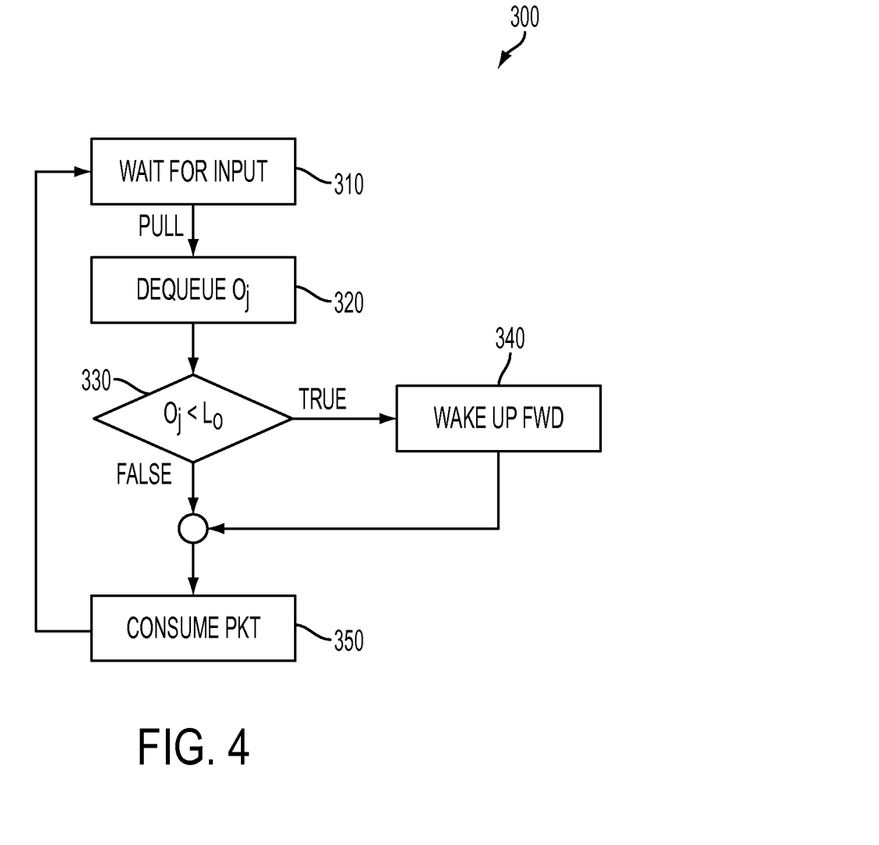
FIG. 4 depicts a method of controlling an output side of data traffic within a network with a virtual switch according to another embodiment of the present invention.

Referring now to FIG. 4, a method 300 of controlling an output side of data traffic in a network with a virtual switch is shown according to an exemplary embodiment of the present invention. The processor may wait for receipt 310 of a data packet designated for output through the output buffer queue. The processor may de-queue 320 the data packet, i.e., release the data packet from the output buffer queue. The processor may determine 330 whether the output buffer queue storage is below the threshold signaling room for receipt of new data packets. If the output buffer queue storage is below the threshold, then the processor may issue a command to wake up a forwarding function in the controller 140 and restart sending of data packets from the input buffer queue. After the wake up command or if the output buffer storage is higher than the threshold signaling room for receipt of new data packets, then the processor may direct the system to consume 350 the data packet (send the packet to its destination). In an exemplary embodiment, the packet's destination may be a virtual switching entity or a virtual machine (VM) hosted on the same virtualization platform. The processor may then wait for receipt 310 of the next data packet.

Figure 5:
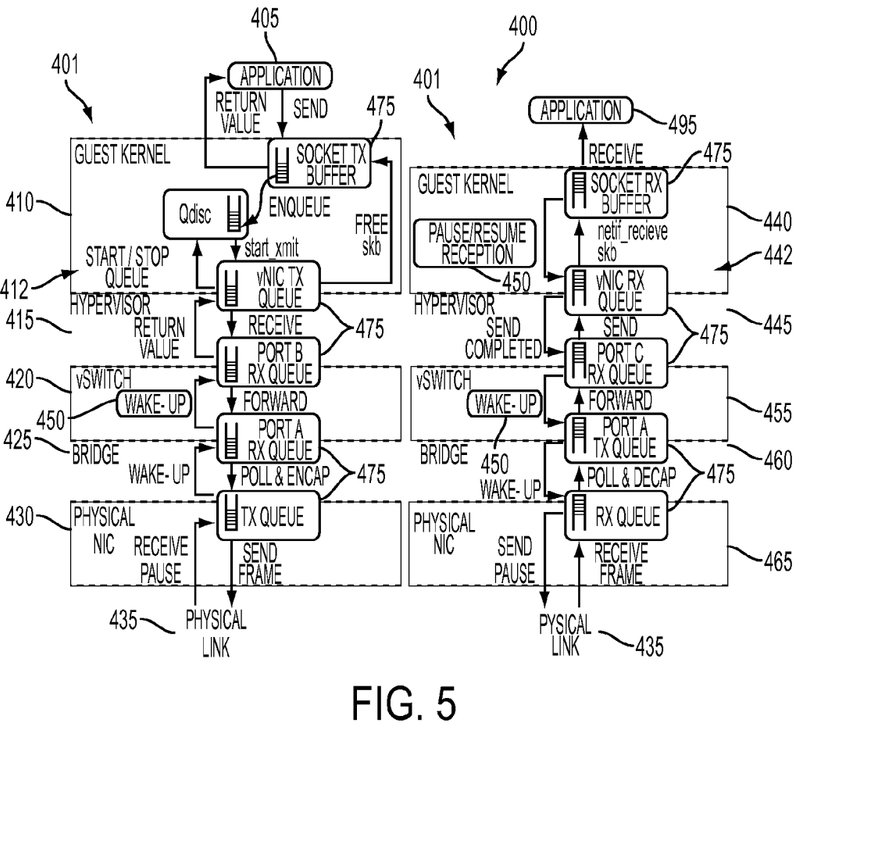
FIG. 5 depicts a block diagram of a packet path within a virtual machine according to another embodiment of the present invention.

Referring now to FIG. 5, the transmission and reception path scheme 400 between queues 475 in a virtual machine 401 is shown. Assuming a collection of virtualized servers each running a set of virtual machines, the servers may be interconnected through a flat L2 fabric. The physical network may have per-priority flow control allowing the network administrator to configure one or more priorities as lossless. Without loss of generation, a single lossless priority may be used. The physical per-priority flow control may be continued into the virtual domain by hypervisor software implementing embodiments of the present invention as described above.

The data packets may travel between processes (applications) 405 running inside the VMs 401. The packets may move from one queue 475 to another queue 475 within different software and hardware components. The details of this queueing system are described with emphasis on the flow control mechanisms between each interfacing queue 475 pair. The packet transmission and reception paths are shown in FIG. 5.

After processing within the VM's guest kernel 410 the packets may be transferred to the hypervisor 415 through a virtual adapter (vNIC) 412. The hypervisor 415 may send the packets to the virtual switch 420. The virtual switch 420 assures the communication between VMs 401 and the physical adapter 430. The packets that have as destination addresses remote VMs (not shown) may be taken over by a bridge 425 that encapsulates them and moves them to the physical adapter 435 queues. The packets may travel through the physical network (represented as physical link 435) and may be delivered to the destination server where they may be taken over by the bridge 460 that decapsulates them and moves them into the destination's virtual switch 455. The virtual switch 455 does the forwarding and the packets may be received by the hypervisor 445 that forwards them to the guest kernel 440. After processing in the guest kernel 440 the packets may be delivered to the application 495. The loss points 450 (where data packets are dropped or lost) are labeled as "wake-up" and "pause/resume reception".

On the transmit side the packets may be generated by the user space processes. The process may issue a send system call that copies the packet from user space to the guest kernel space 410. After the copy the packets may be stored in a sk_buff data structure that is enqueued in the TX buffer of the socket opened by the application 405. The application may be aware if the TX queue is full through the return value of the system call making this operation lossless. The packets from the socket TX buffer are enqueued in the Qdisc associated with the virtual interface. The Qdisc may stores a list of pointer to the packets belonging to each socket. The pointers may be sorted according to the selected discipline i.e. FIFO by default. To avoid packet losses at this step the length of the Qdisc may be increased to match the sum of all socket TX queues. As some may appreciate, this change may require only negligible amounts of memory. The Qdisc may try to send the packets by enqueueing them into the adapter TX queue. If the TX queue reaches a threshold (typically one MTU below maximum) the Qdisc may be stopped and the transmission may be paused thus avoiding losses on the TX path of the kernel. When the TX queue drops below the threshold the Qdisc may be restarted and new packets may be enqueued in the TX queue of the virtual adapter 412. Thus, the entire transmission path in the guest kernel 410 OS may become lossless. The architecture implemented may be based on, for example, Virtio™ technology. Hence the virtual adapter 412 queues 475 may be shared between the guest kernel 410 and the underlying hypervisor software 415 running in the user space of the host. The network adapter 412 may inform the hypervisor 415 when new packets are enqueued in the TX queue of the adapter 412. The hypervisor software 415 may be based on, for example, Qemu. The hypervisor 415 may be responsible for taking packets from the TX queue 475 of the virtual adapter 412 and copying them in the TX queue 475 of the virtual switch 420. The packets may arrive at the virtual switch TX queue 474 of the port where the VM 401 is attached. The virtual switch 420 may take the packets from the TX queues 475 of the input ports and may add them to the RX queues 475 of the output ports. The switching may be done based on a forwarding table. The forwarding table may contain the MAC addresses of the locally connected VMs. If the destination is found to be locally connected, the packets may be moved to the corresponding RX queue 475. Otherwise they may be enqueued in the RX port corresponding to the physical interface 435. From the physical interface port the packets may be consumed by a bridge 425 that does the encapsulation step and enqueues the packet in the TX queue 475 of the physical adapter 430. Then the lossless physical network may take over the packet and deliver it to the destination server RX queue. Thus, internal flow control may be achieved making the TX path fully lossless.

On the reception side, the packets may be consumed by the bridge 460 from the RX queue of the physical NIC and decapsulated. The packets may be enqueued in the TX queue 475 of the virtual switch 455 that forwards them to the RX queue 475 corresponding to the destination VM 401. The forwarding done may be lossless. The packets may be consumed by the hypervisor 445 that copies them into the virtual device 442 (e.g. vNIC). The virtual device RX queue 475 may be shared between the hypervisor 445 and the guest kernel 440. The hypervisor 445 notices the guest kernel 440 when a packet is received and the guest OS receives an interrupt. This interrupt may be handled according to the Linux NAPI framework. A softirq may be raised that consumes the packets from the RX queue. The packet may be transferred to the netif_receive_skb function that does the IP routing and filtering. If the packet is found to be destined to the local stack it is enqueued in the destination socket RX buffer based on the port number. If the destination socket if full the packet may be discarded. In embodiments using a TCP socket this should not happen since TCP has end to end flow control that limits the amount of injected packets to the advertised window of the receiver. In embodiments using UDP sockets a modified Linux Kernel may be used such that when the destination socket RX queue occupancy reaches a threshold (e.g. one MTU below maximum) the softirq may be canceled and the reception may be paused. Once the process consumes data from the socket the reception may be resumed. This ensures full lossless operation both for TCP and UDP sockets.

The virtual switch may have one port for each VM 401 running on the server plus one additional port for the physical interface. Each port may have an input (TX) queue for the packets produced by the VMs 401 or received from the physical link 435. Each port may have an output (RX) queue for the packets to be consumed by VMs 401 or sent out over the physical link 435. To provide a software based switch with lossless characteristics, the switch work may be implemented according to the pseudocode from Algorithm 1.

---

Algorithm 1 Lossless Switch Operation.

•Sender (Ij)
  while true do
    Produce packet P
    if Input queue Ij full then
      Sleep
    else
      Ij:enqueue(P)
      start Forwarder(Ij)
    end if
  end while
•Receiver (Ok)
  while true do
    if Output queue Ok empty then
      for all Input queue Ij do
        start Forwarder(Ij)
      end for
    end if
    if Output queue Ok empty then
      Sleep
    else
      P  Ok:dequeue( )
      consume packet P
    end if
  end while
•Forwarder (Ij)
    for all packet P in input queue Ij do
      find output port k
      if not Output queue Ok full then
        Ij:erase(P)
        Ok:enqueue(P)
        wake-up receiver (Ok) and sender (Ij)
      end if
    end for

---

Each sender (producer) is connected to an input queue Ij and each receiver (producer) is connected to an output queue Ok. After a packet is produces the sender checks if the associated TX queue is full. If full it goes to sleep until a free buffer becomes available else the producer enqueues the packet in the TX queue and then starts a forwarding process to try to push some packets from the input queue to the output queues. The forwarder checks the output queues if there is space available in one of them. If yes it transfers the packets to the output queues and wakes up the corresponding consumers that might be waiting for new packets. On the receiver side the associated output queue is checked. If not empty a packet is consumed else the forwarding process is started to pull out some packet from the input queues to the output queue. If some data is pulled then it is consumed else the receiver sleeps until woken up by the sender. Observe that the switch is designed to operate in a dual push/pull mode. When the sender is faster than the receiver the sender will sleep most of the time waiting for free buffers and the receiver will wake it up only when it consumes data. On the other hand when the receiver is faster than the sender the receiver will sleep most of the time and the sender will wake it up only when new data is available. The overhead of a lossless switch is thus reduced to a minimum.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program product for controlling data traffic in a network with a virtual switch, the computer program product comprising a computer readable hardware storage medium having program code embodied therewith, the program code readable/executable by a processor to:

determine, by the processor, that a data packet is designated for queuing up in software defined buffer queues, wherein the buffer queues are one of a first buffer queue of a data packet producer and a second buffer queue of a data packet consumer, at least one of the data packet producer or the data packet consumer is a virtual entity, and the buffer queues are connected to both sides of the virtual switch, between a physical input port and a physical output port of a server on which the virtual switch runs, and wherein the virtual switch is configured to send the data packet to an external application via a hypervisor;

determine, by the processor, whether a threshold in the buffer queues is exceeded;

generate, by the processor, flow control commands between the data packet producer and the data packet consumer; and control, by the processor, the flow of the data packet to or from the virtual switch based on the determination of the threshold in the buffer queues being exceeded by issuing a start command to the data packet consumer to start receiving data packets.

2. The computer program product of claim 1, the program code being readable/executable by the processor to issue a stop command to the data packet producer to stop sending more data packets to the buffer queues in response to the threshold in the buffer queues being exceeded.

3. The computer program product of claim 1, wherein the buffer queues include an output buffer queue and the threshold is a maximum number of data packets in the output buffer queue.

4. The computer program product of claim 1, the program code being readable/executable by the processor to determine by the processor, whether the threshold is no longer exceeded, signaling room for receipt of more data packets in the buffer queues.

5. The computer program product of claim 1, wherein the buffer queues include an input buffer queue and the threshold is a maximum number of data packets in the input buffer queue.

6. A system, comprising:
a first switching interface, wherein the first switching interface is configured to receive data packets from a physical network interface card via a hypervisor;
a first software defined buffering area connected to the first switching interface;
a second switching interface configured for virtual switching in a data network;
a second software defined buffering area connected to the first buffering area and to the second switching interface within a server on which the virtual switching occurs; and
a processor configured to synchronize, between the first switching interface and the second switching interface, wherein at least one of the first switching interface or the second switching interface is a virtual entity, an On/Off flow control loop of flow control commands and to control a lossless data transfer flow of data packets between the first buffering area and the second buffering area, based on whether a threshold in the second buffering area is exceeded by a maximum number of data packets by issuing a stop command to the first buffering area to stop sending data packets.

7. The system of claim 6, wherein the first switching interface is configured for virtual switching in the data network.

8. The system of claim 6, wherein the first switching interface is configured for physical switching in the data network.

9. The system of claim 6, wherein the first buffering area is an input buffer and the second buffering area is an output buffer.

10. The system of claim 9, wherein the processor is configured to stop the flow of data packets to the input buffer in response to the maximum number of data packets in the output buffer being exceeded.

11. The system of claim 9, wherein the processor is configured to stop a flow of data packets to the input buffer from the first switching interface in response to a maximum number of data packets in the input buffer being exceeded.

12. A method of controlling data packet flow in a network with at least one virtual switching entity, comprising:
receiving a data packet either with a source address from the virtual switching entity or designated with a destination address to the virtual switching entity;
determining whether the data packet is designated for queuing in a first software defined buffer queue, wherein the first buffer queue is one of a buffer queue of a data packet producer or another buffer queue of a data packet consumer, and at least one of the data packet producer or the data packet consumer is a virtual entity;
queuing the data packet in the first buffer queue;
determining whether a threshold of the first buffer queue has been exceeded;
determining whether a second buffer queue threshold has been exceeded if the first buffer queue threshold has not been exceeded;
stopping the data packet from being queued in the second buffer queue when the second buffer queue threshold has been exceeded;
receiving flow control commands, without packet loss or packet drops, at either the data packet producer or the data packet consumer; and
controlling a flow of more data packets, either with a source address from the virtual switching entity or with a destination address to the virtual switching entity, to the first buffer queue if the threshold has been exceeded by routing data packets from the source address of the data packets to the destination address for the data packets via at least one hypervisor.

13. The method of claim 12, including stopping more data packets from flowing to the buffer queues if the threshold has been exceeded.

14. The method of claim 12, including:
using a Single Rooted I/O Virtualization (SR-IOV) or Multi-Rooted I/O Virtualization (MR-IOV) signal to copy the more data packets into an output buffer queue while bypassing the virtual switching entity; and
providing flow control in the output buffer queue if a threshold in the output buffer queue has been exceeded.

15. The method of claim 12, wherein the first buffer queue is an output queue interfacing with either another virtual switching entity or a virtual machine.

* * * * *